A. L. MORTON.
APRICOT AND PEACH CUTTER.
APPLICATION FILED OCT. 16, 1911.
1,033,446.
Patented July 23, 1912.
2 SHEETS—SHEET 1.
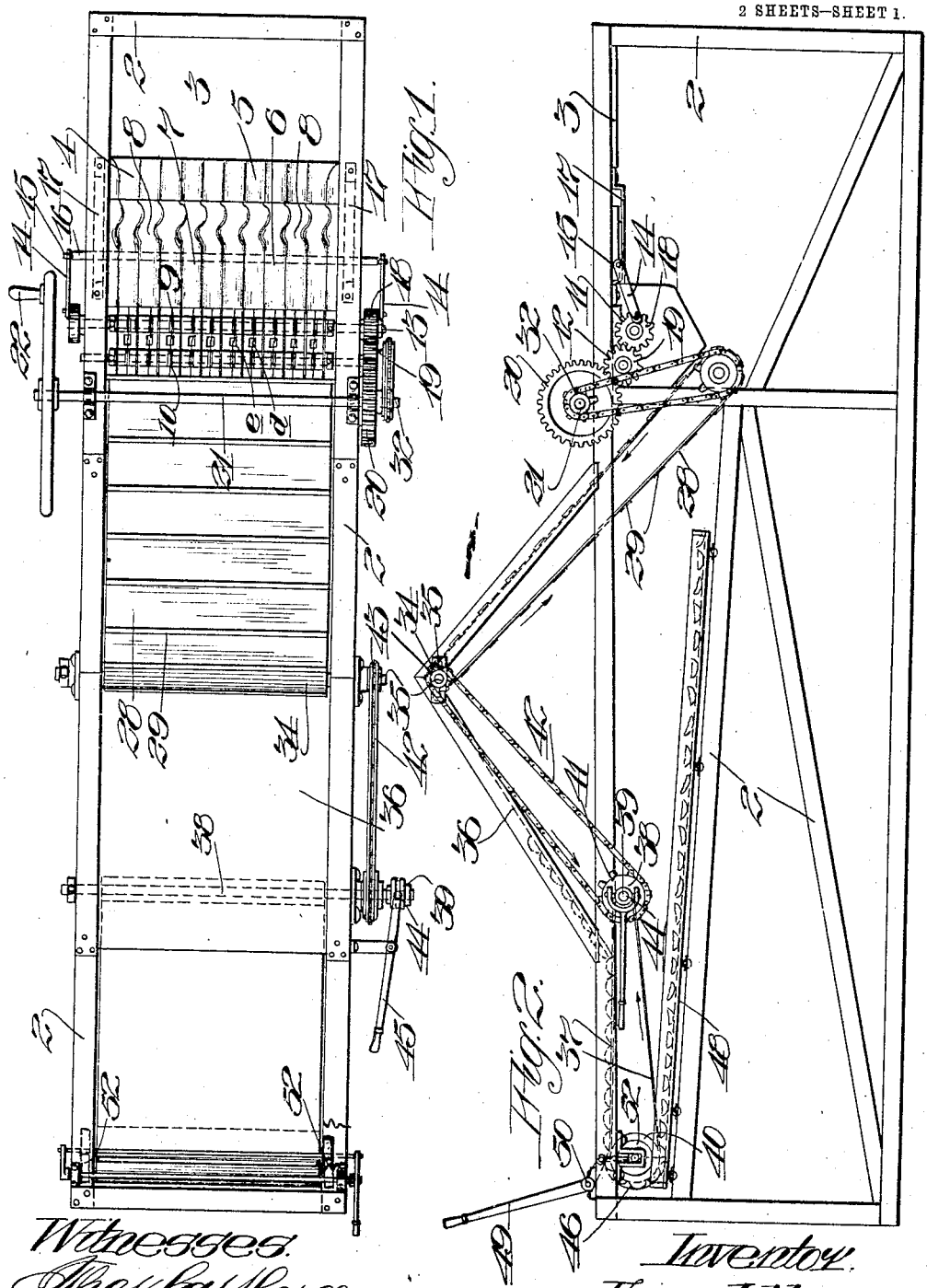

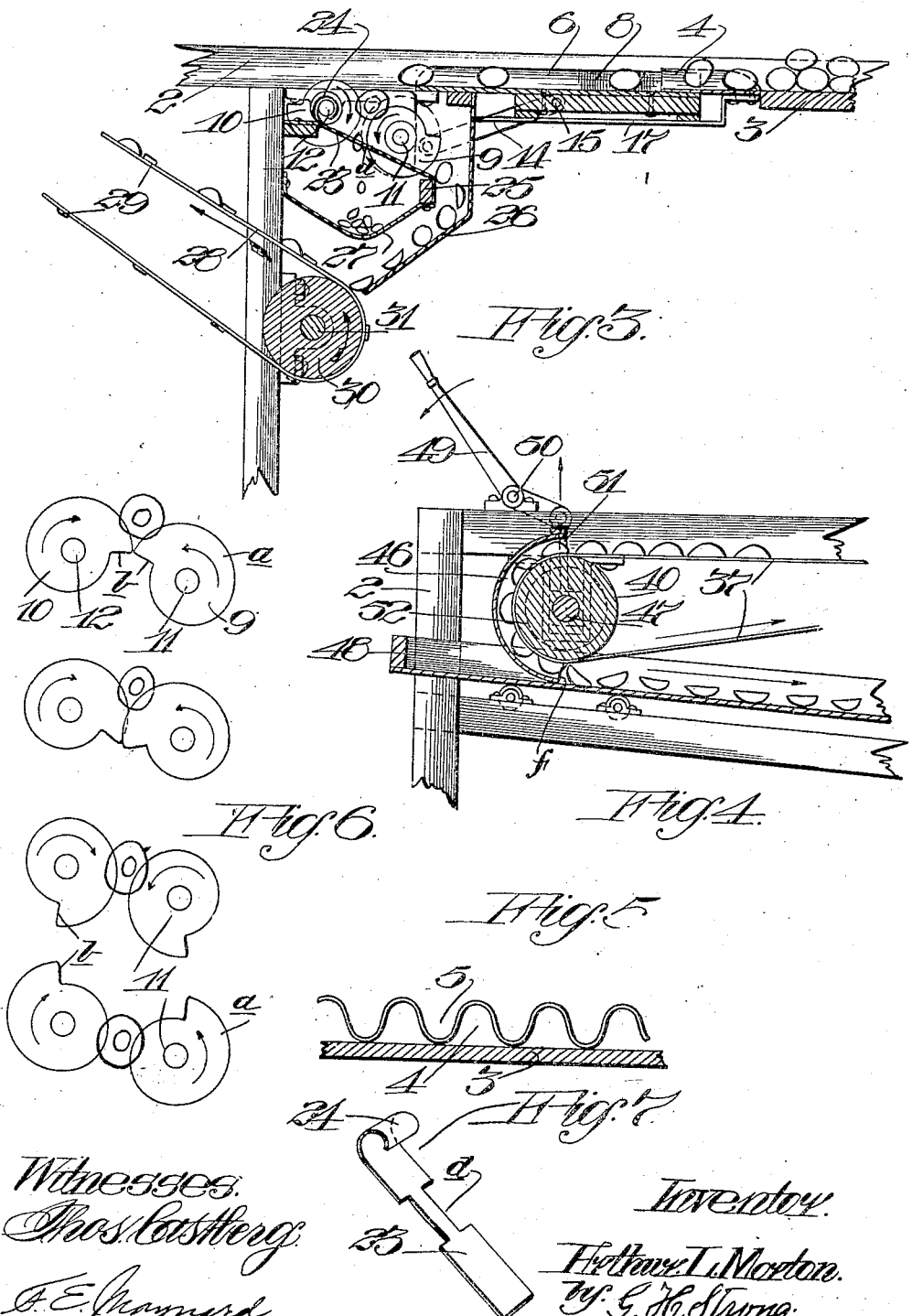

UNITED STATES PATENT OFFICE.

ARTHUR L. MORTON, OF MOUNTAIN VIEW, CALIFORNIA.

APRICOT AND PEACH CUTTER.

1,033,446.

Specification of Letters Patent.

Patented July 23, 1912.

Application filed October 16, 1911. Serial No. 654,875.

*To all whom it may concern:*

Be it known that I, ARTHUR L. MORTON, a citizen of the United States, residing at Mountain View, in the county of Santa Clara and State of California, have invented new and useful Improvements in Apricot and Peach Cutters, of which the following is a specification.

This invention relates to apparatus for cutting and pitting fruit, and particularly to an apparatus for the cutting and pitting of apricots and peaches.

The object of the present invention is to provide a machine of large capacity, wherein certain fruit may be prearranged for the operation of slitting or cutting; to provide improved cutting knives, whereby the fruit is sliced or severed into two substantially equal parts, and by which the fruit is also pitted; and to provide an apparatus having the function of separating the pits from the meat of the fruit and conveying the fruit meat to, and placing it compactly upon, a drying or other tray.

It is another object of the invention to provide an apparatus by which the fruit, which may be fed into a hopper, will ultimately be delivered with its flat or cut surface upward upon a tray on which the fruit may be transported to the drier or other place.

The invention consists of the parts and the construction and combination of parts, as hereinafter more fully described and claimed, having reference to the accompanying drawings, in which—

Figure 1 is a plan view of the machine. Fig. 2 is a side elevation of the machine. Fig. 3 is an enlarged detail view of the positioning and cutting mechanism. Fig. 4 is an enlarged detail view of the apricot turning structure. Fig. 5 is a section of the fruit adjusting and feeding throat. Fig. 6 shows the cutter in diagram. Fig. 7 is a perspective view of the pit and fruit separating strips.

It is a desideratum to provide a simple, yet reliable, machine for the handling of peaches, apricots and certain other fruit in large quantities, in such a manner as to most inexpensively prepare them for subsequent operations, such as drying, etc., and in the present construction I have shown the apparatus as comprising a suitable frame 2 of the desired design and proportions, having at its feed end a slightly inclined hopper or plate 3, upon which may be promiscuously placed the fruit to be operated upon. The incline of the hopper 3 will be sufficient normally to cause the fruit to roll into a separator 4 formed with a plurality of parallel channels or grooves 5, and from the separator 4 the fruit rolls onto a peculiarly designed feeding device or carrier 6 formed with a number of channels 7 substantially alined with the channels 5 of the separator 4.

A portion of the channels of the carrier or feeder 6 is formed with a peculiar curved structure, indicated at 8, the function of which is to rotate or adjust certain fruits, such as apricots, so that the peripheral crease existing in this particular fruit will be caused to arrange itself substantially in line with the axis of the feeder channels 7, and thereafter when leaving the adjusting portions 8, the fruit will travel in a straight line down the feeder 6 with the crease mentioned substantially central between the top edges of the channels 7.

The corrugated feeder 6 is preferably reciprocated, so as to cause the fruit to advance in certain regular, intermittent steps and be discharged from the lower end of the feeder into a portion of the apparatus in which are mounted a plurality of knives or cutters 9 and 10, which are respectively arranged in parallel relation upon shafts 11 and 12. Upon the ends of the shaft 11 are secured cranks 13, upon which are mounted pitmen 14 connected to pins 15 which are secured to a transverse bar or shaft 16 fastened to the feeder 6; the latter being supported to slide or reciprocate upon bearings 17 appropriately secured to the frame 2.

Motion is imparted to the cutter shaft 11 by means of a gear 18 secured on one end, and which gear derives power from another gear 19 of similar proportion which is secured upon the parallel cutter shaft 12; the latter shaft in the present instance shown as being mounted in a plane somewhat higher than that of the shaft 12. The gear 19 of the shaft 12 is in mesh with and driven by the master gear 20 secured upon a driving shaft 21, upon the opposite end of which may be mounted a suitable wheel, gear, or crank, as 22, whereby power may be applied to drive the shaft 21. As the fruit is shifted or fed in substantially continuous rows across the apparatus, it falls substantially between the shafts 11 and 12 and upon that particular set of cutters which is alined with the center of the channel 7 of the feeder 6. As the cutters revolve, the fruit which rests upon their edges is gradually slit or cut by the involute edges $a$ of the cutters, which edges terminate in radial shoulders $b$. The cutters rotate so that the shoulders $b$ move toward each other and will meet centrally and slightly overlap between the shafts 11 and 12. At the instant of overlapping of the shoulders $b$ of the cutters they will encounter the pit of the fruit which has been cut by the gradual rotation of the cutters. The pieces of the fruit will rest upon a sectional platform or support formed of a plurality of tongues 23 having hook ends 24, which are placed over and rest upon the upper shaft 12. The lower ends of the tongues 23 rest upon a bracket or support 25 secured to a transverse diaphragm or apron 26 mounted in the frame substantially below the cutters. The tongues 23, which go to form a support for the slices of the fruit after they are severed by the knives, are each provided on side edges with recesses or notches $c$ which form, when the tongues 23 are placed edge to edge, openings $d$ through which the pit of the fruit is forced when it is encountered by the coinciding and overlapping shoulders $b$ of the cutters. After the fruit has been severed and the pits forced through the discharge opening $d$, the pits drop onto a discharge trough 27 and the severed sections of the fruit slide down the platform formed of the tongues 23, and fall through openings in the bracket 25 and thence on to the diaphragm or apron 26 down which they slide haphazardly and on which they accumulate; the lowermost sections of the fruit being pressed against the surface of an upwardly traveling conveyer belt 28 upon which are attached a number of spaced, transversely disposed slats 29.

In actual practice the slats 29 are quite thin, and I have found that ⅛ inch thickness is ample. As they pass beneath the accumulated fruit in the apron 26, the latter will be tumbled or rolled until eventually the flat surfaces of the sections of fruit are brought into flat contact with the upper surface of the upwardly traveling stretch of the conveyer 28, and when the flat surfaces so rest upon the conveyer 28, the edge of each section of fruit will be encountered by the thin slats 29, and as fast as the fruit sections become arranged flatwise, they will be carried upwardly resting against the edge of the thin slats 29. The lower end of the conveyer 28 runs around a suitable drum or cylinder 30 mounted upon a shaft 31, which is driven by the sprocket gear train 32, the driving sprocket member 33 of which is secured upon the main drive shaft 21. The conveyer belt 28 is shown as being arranged at an incline and its upper end passes over a drum or cylinder 34 mounted on a suitable shaft 35. As the belt turns around the cylinder 34, the fruit sections are discharged therefrom upon an inclined platform or chute 36, which may be of sheet iron, and the upper end of this is brought into close juxtaposition with the surface of the fruit lifting belt 28. The sections of fruit discharged from the belt slide down the chute 36 and accumulate at its lower end in a compact, continuously arranged, though flat mass, the lowermost section of the fruit being picked up in a continuous transverse row by a conveyer belt 37, which runs beneath the lower end of the chute 36 and is supported upon a driving cylinder or drum 38 carried by the shaft 39 and also supported at its other end by a cylinder 40. The shaft 39 carries a sprocket wheel 41, over which travels the drive chain 42 driven by sprocket wheel 43 mounted upon one end of the shaft 35. The sprocket wheel 41 is loose on the shaft 39, and is provided with a clutch face adapted to be engaged by a shiftable clutch collar 44 which may be operated by a handle or lever 45.

One of the important features of the present invention is the means by which, after the sliced fruit has been severed and the sections conveyed in proper position to the chute and from the chute delivered upon a conveyer 37, the sections of fruit are uniformly and positively delivered onto the tray or other device with the flat surfaces of the fruit sections uppermost. This means comprises in the present instance the carrying belt 37 and the cylinder 40 around which it travels, and also involves a semi-cylindrical shell or hood 46, which is mounted upon a shaft 47 carrying the drum or cylinder 40 and the surface of the hood 46 is preferably just sufficiently distant from, and concentric with, the cylinder 40 so as to positively retain the fruit sections with their faces against the surface of the belt or conveyer 37 while they are being carried around the cylinder 40. Thus the hood 46 has the function of preventing the slipping, dislodgment or overturning of the fruit sections while they are carried around and until they are eventually deposited on to the tray 48 by slipping off the lower transverse edge $f$ of the hood 46. By the peculiar relationship of the chute 36 onto which the sections of fruit are discharged from the conveyer 28 and the position of the conveyer 37, upon which successive transverse rows of fruit sections are received, it is insured that the tray 48 will be compactly filled with sections of fruit arranged in transverse rows; all of the sections being placed face up, that is, with the cut surfaces uppermost.

This apparatus is designed particularly to fill trays, such as 48, which are portable and easily transferable from one position to another or to some subsequent apparatus wherein may be performed the desired processes, and to that end I have constructed the present apparatus so that the tray 48 may be inserted endwise beneath the cylinder 40, and then when the clutch 44 is thrown to engage the sprocket wheel 41, the conveyer 37 will be driven and the fruit collected from the chute 36. As the front end of the tray 48 is inserted beneath the cylinder 40, the latter is lifted so as to clear the end of the tray by depressing a lever 49 fulcrumed at 50 and connected by the link 51 to the cylinder shaft 47, thus lifting the cylinder 40 and the hood 46 sufficiently high to clear the end of the tray. After this has been done the lever 49 is released to allow the lower edge f of the guiding hood 46 to come down into position just above the front end of the bottom of the tray 48, then as the fruit is fed by the conveyer 37 through the hood 46, it is discharged in successive rows on the tray 48. The tray is automatically advanced during the filling by means of rollers 52 secured upon the drum shaft 47, and which rollers 52 rest upon the vertical sides of the tray 48. Thus, it will be seen that as long as the conveyer belt 37 is operative to carry fruit sections through the reversing hood 46, the friction wheels 52 resting upon the edges of the tray 48 will cause this to gradually advance to provide room for the succeeding rows of fruit. An accumulation of down-turned sections of fruit is insured at the lower end of the chute 36 by speeding up the conveyer so that this will always carry a sufficient number of sections to cause them to collect at the lower end of the chute 36 with greater rapidity then they can be carried away by the reversing conveyer 37. After a tray has been entirely filled with fruit sections the operator simply depresses the lever 49 to lift the reversing hood 46 sufficiently to clear the side walls of the tray 48, and the latter can then be removed without interference from the apparatus and conveyed to some other point. The operator unclutches the shaft 39 to stop belt 37 when the tray is to be removed.

Having thus described my invention, what I claim and desire to secure by Letters Patent is—

1. A fruit slicing and pitting machine comprising a feeding mechanism having channels for the passage of the fruit, sets of cutters arranged in parallelism and parallel shafts for the cutters, said channels constructed to automatically position the fruit with its crease presented to the cutters, a supporting platform holding the fruit while being cut, said platform having pit discharge openings, and a receiver for the fruit sections after the pit is removed.

2. A fruit slicing and pitting machine, comprising a feeding mechanism, having channels for the passage of the fruit, sets of cutters arranged in parallelism and shafts upon which the cutters are mounted, said channels constructed to automatically position the fruit with its crease presented to the cutters, a supporting platform holding the fruit while being cut, said platform having pit discharge openings, a receiver for the fruit sections after the pit is removed, and a conveyer for the fruit sections.

3. A fruit slicing mechanism comprising a pair of cutters arranged substantially in a common plane, said cutters having substantially spiral edges interrupted by radial shoulders.

In testimony whereof I have hereunto set my hand in the presence of two subscribing witnesses.

ARTHUR L. MORTON.

Witnesses:
 ROBERT J. LETTS,
 A. F. JOHNSON.